E. P. SHELDON.
ENVELOP MAKING MACHINE.
APPLICATION FILED FEB. 28, 1907.
1,126,305.
Patented Jan. 26, 1915.
11 SHEETS—SHEET 1.
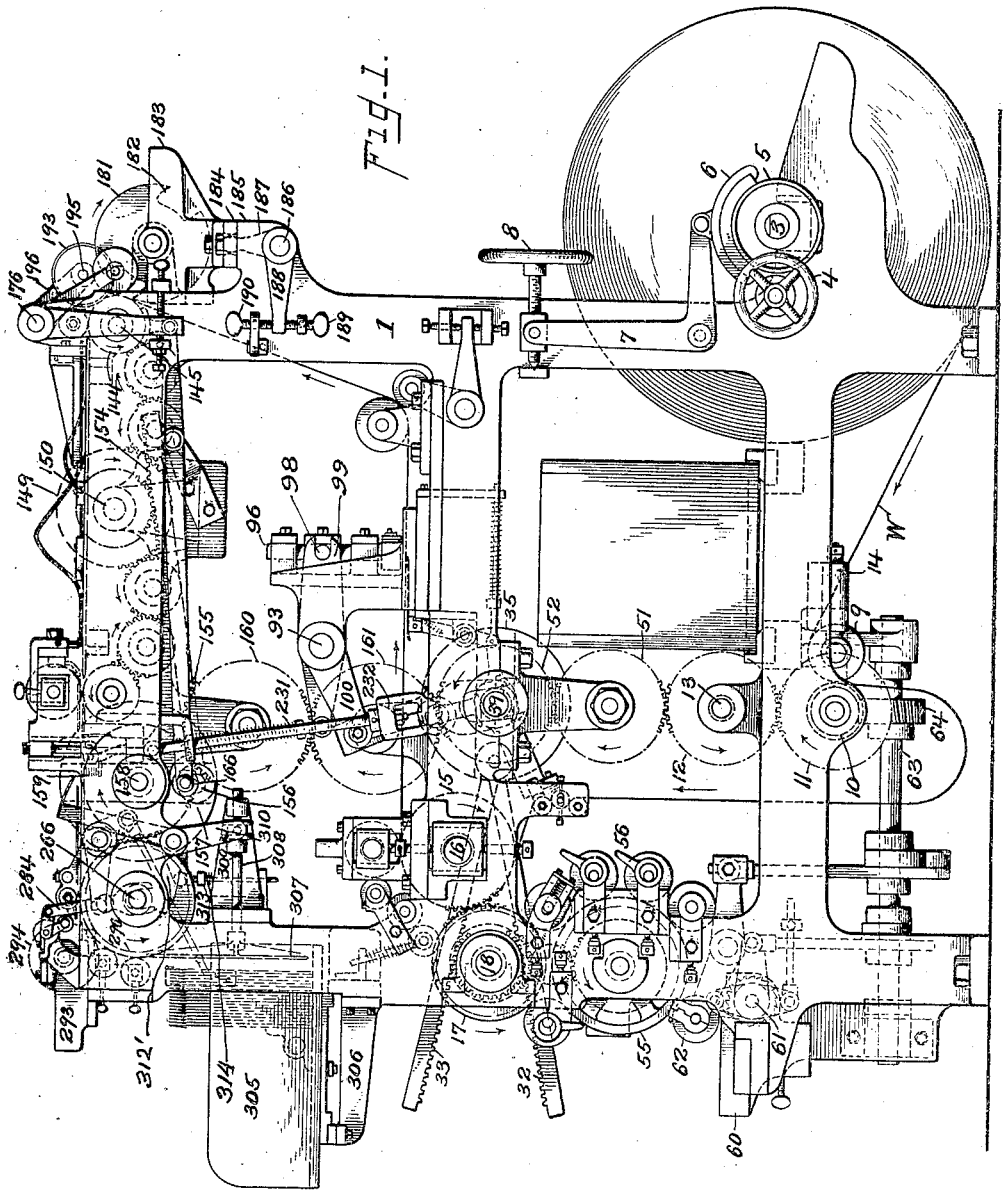

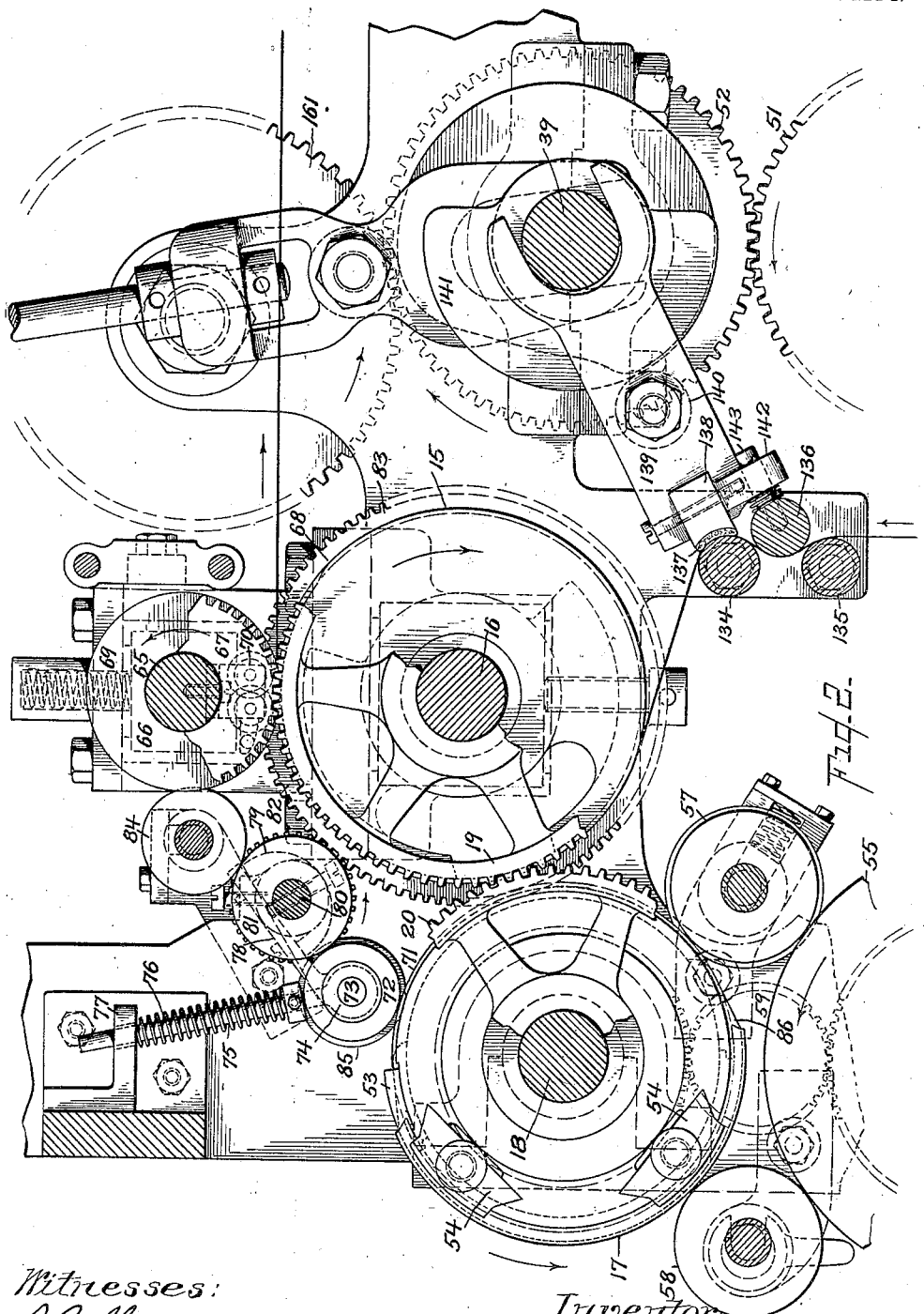

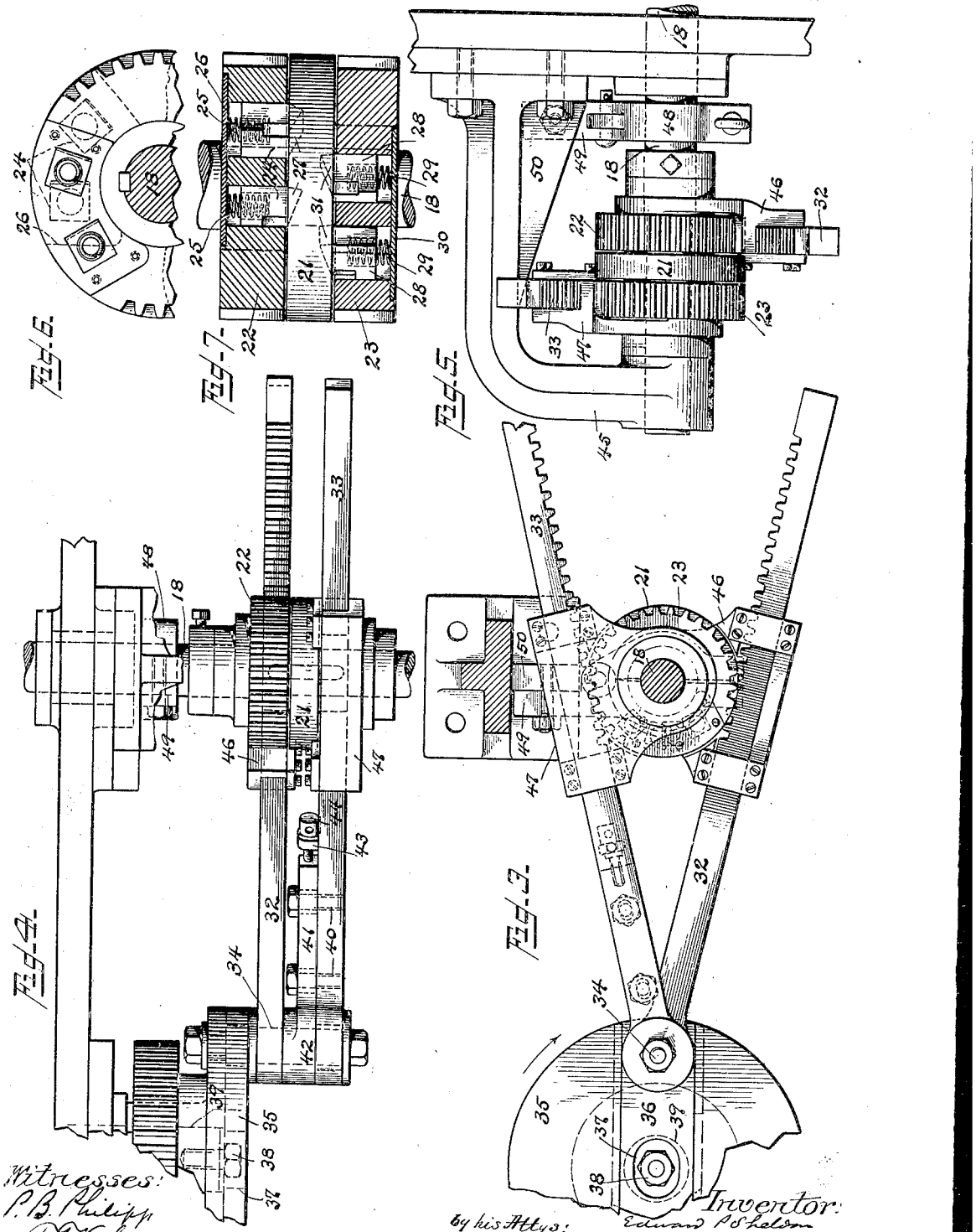

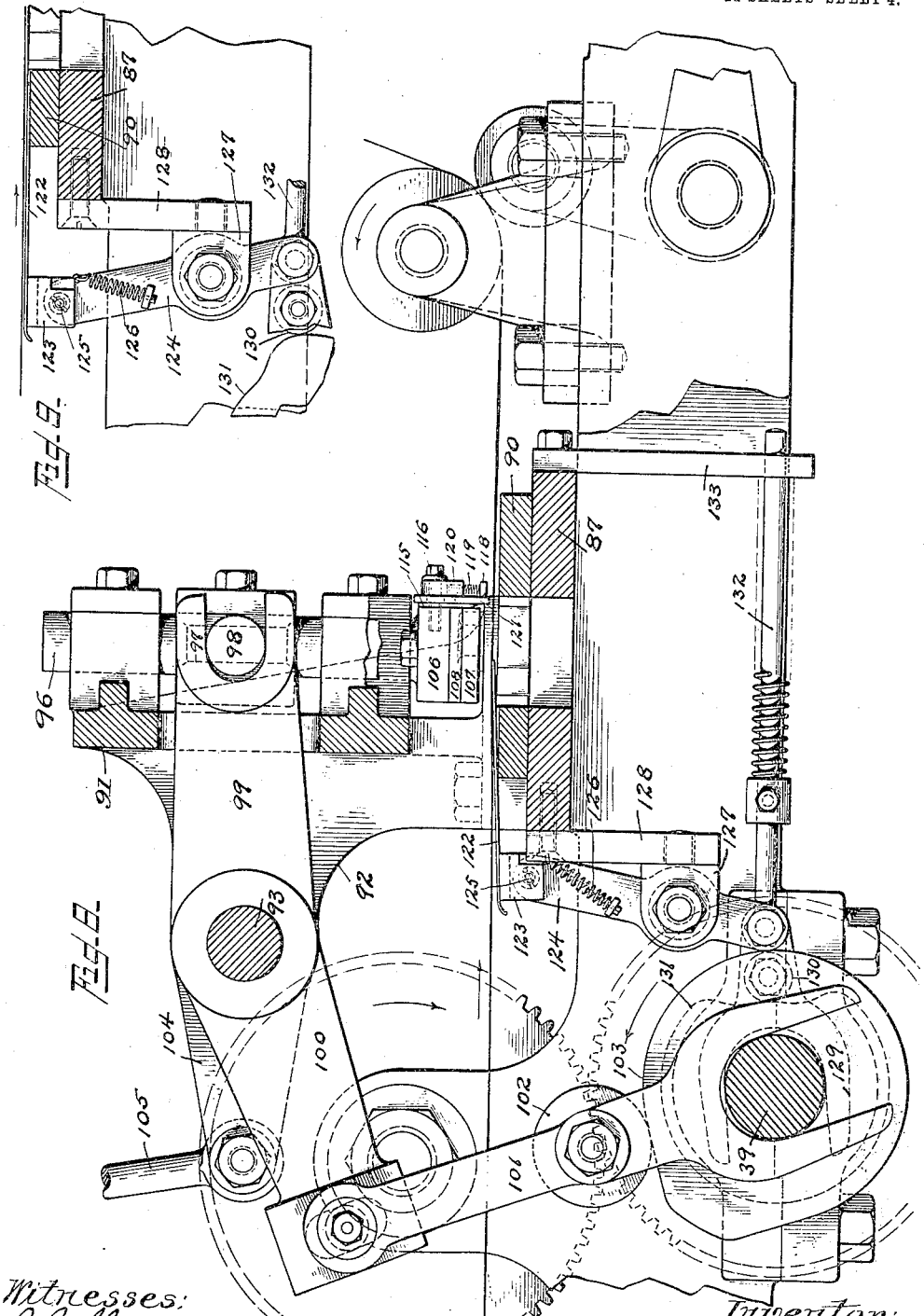

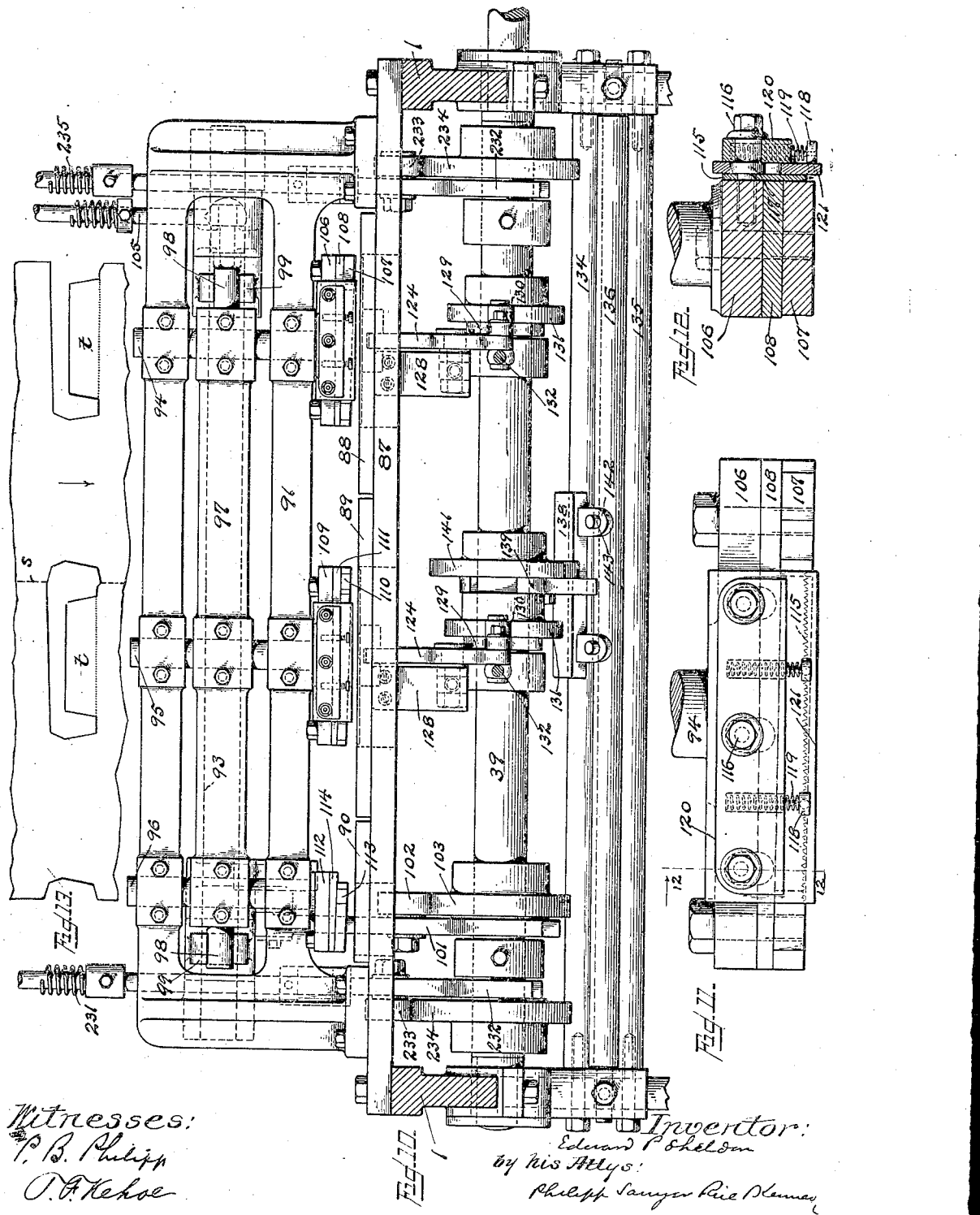

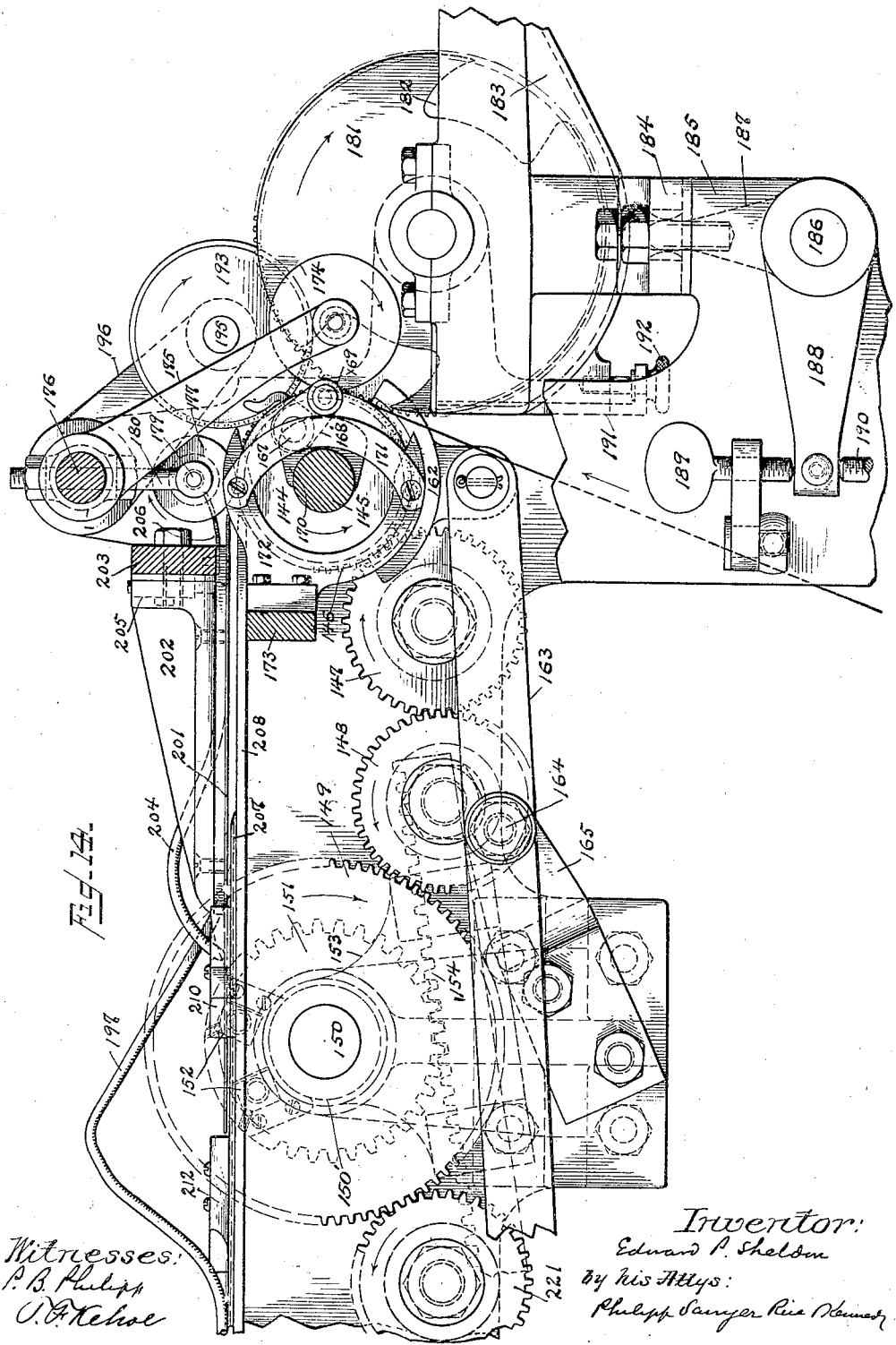

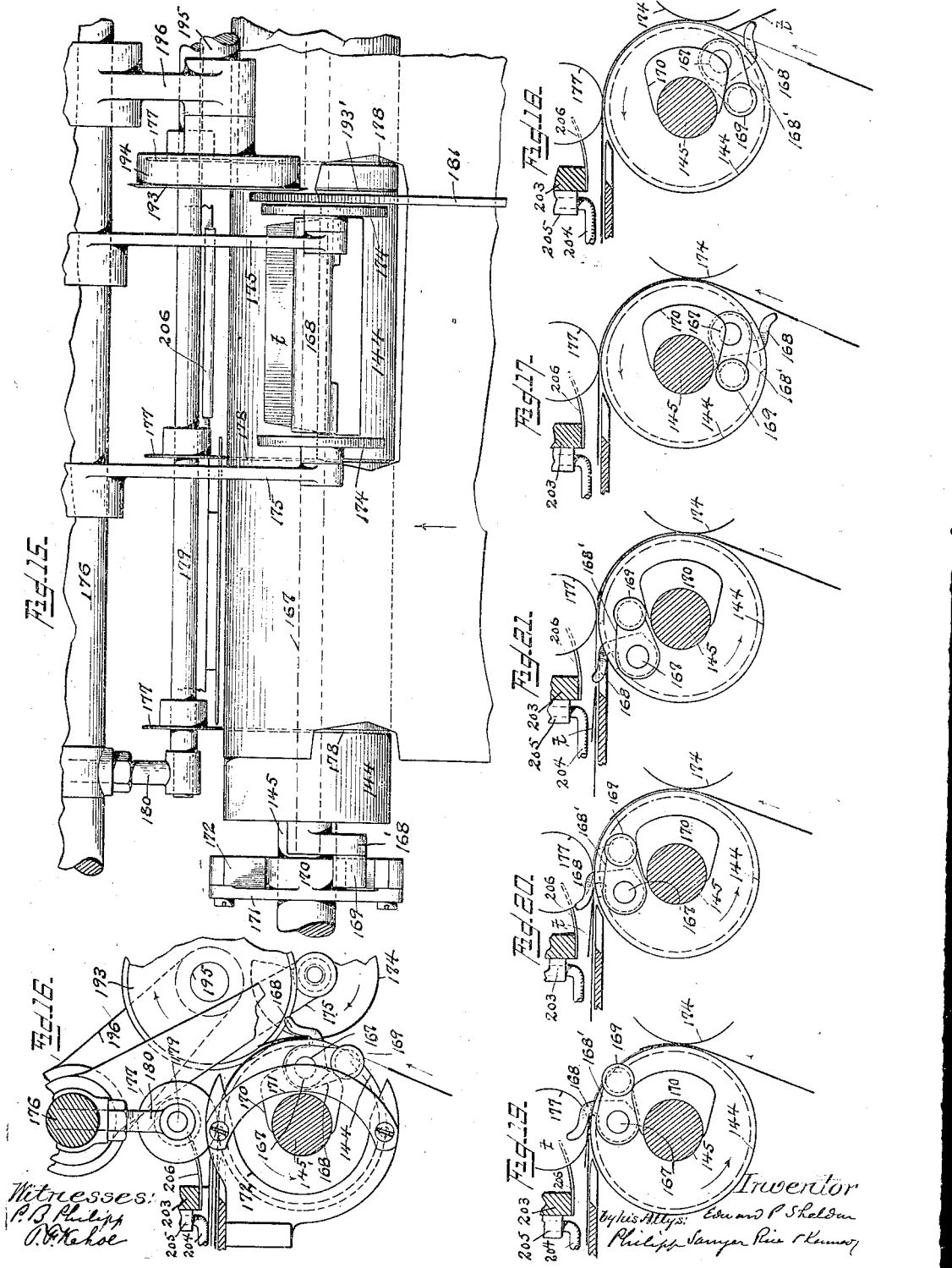

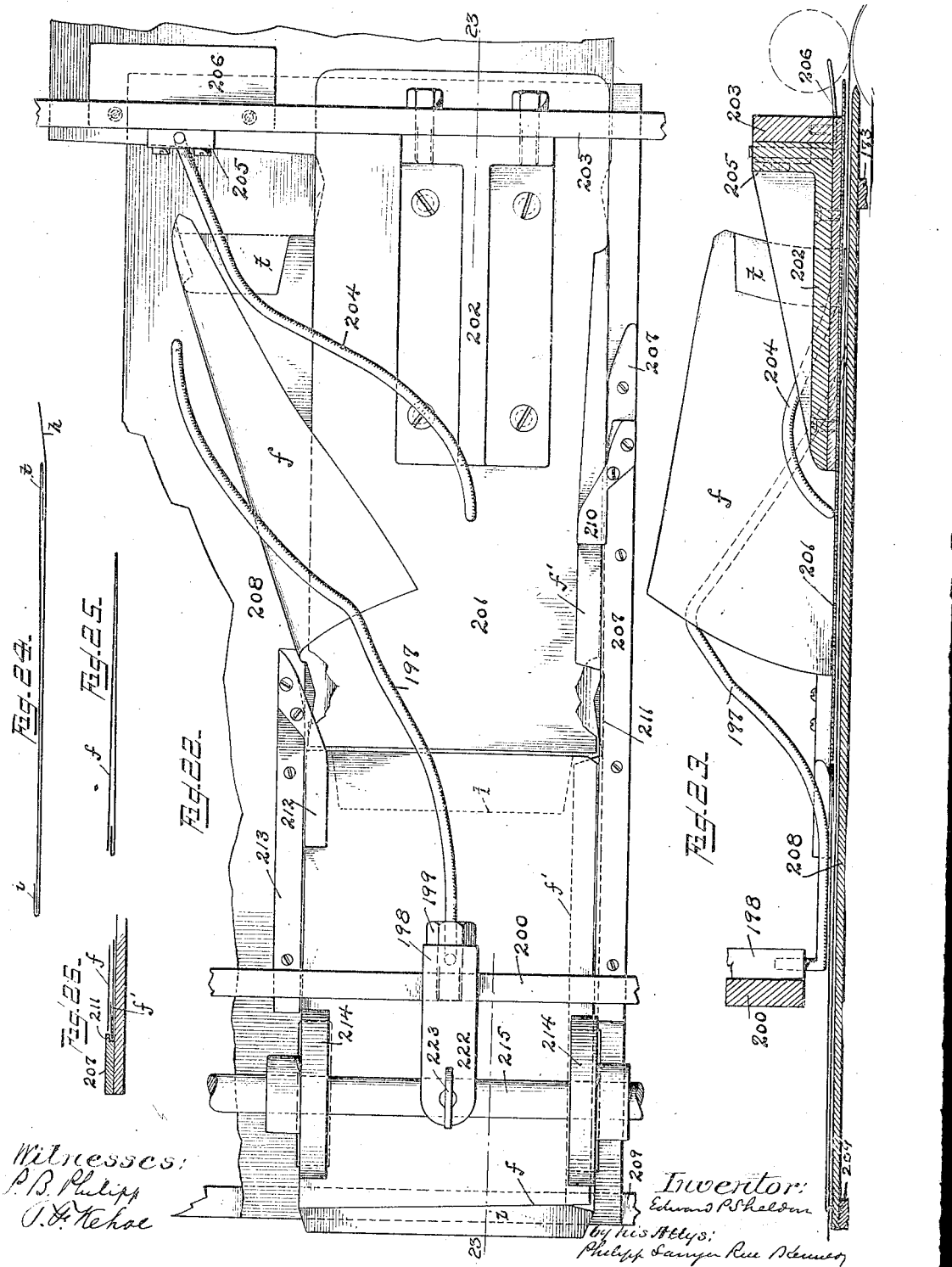

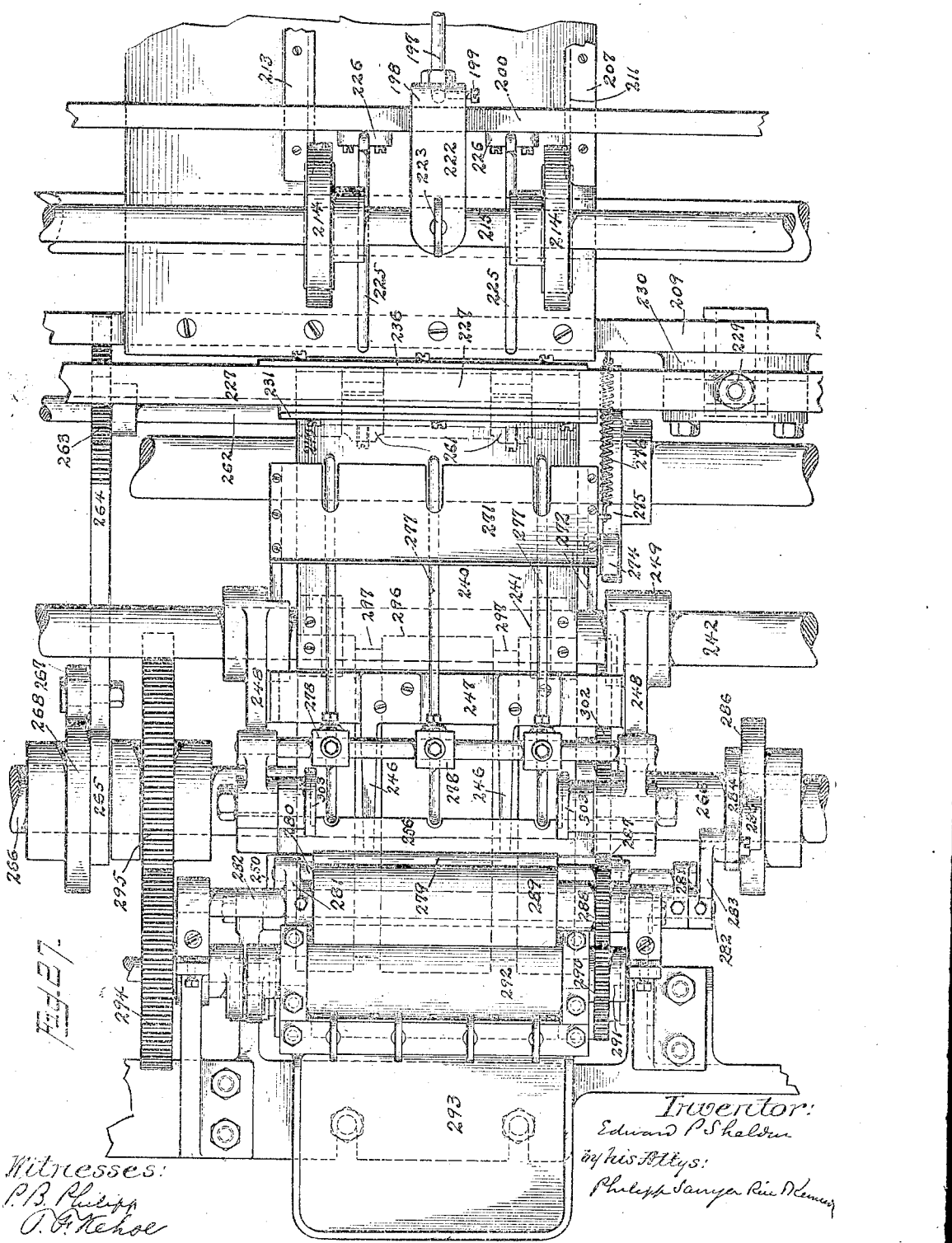

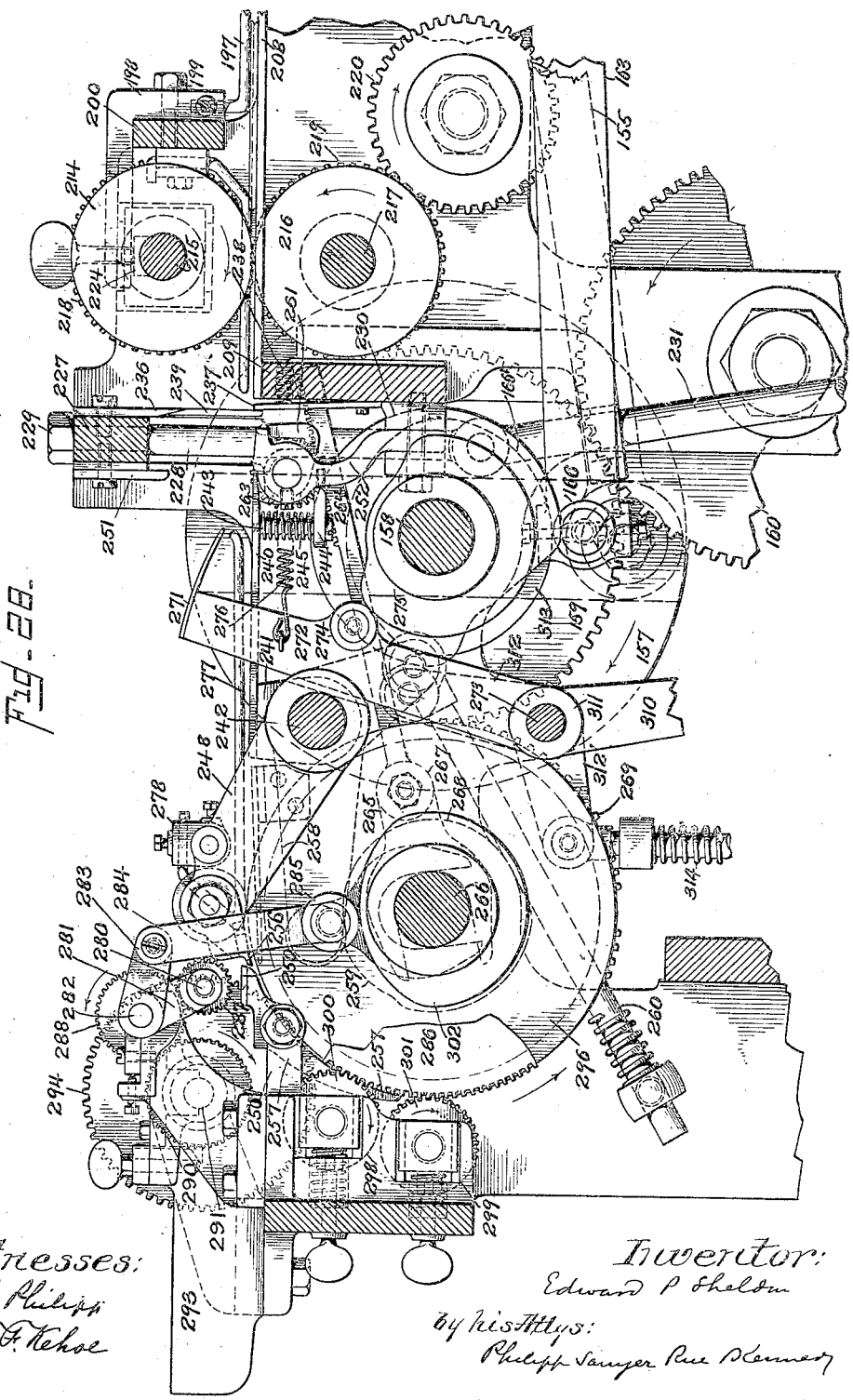

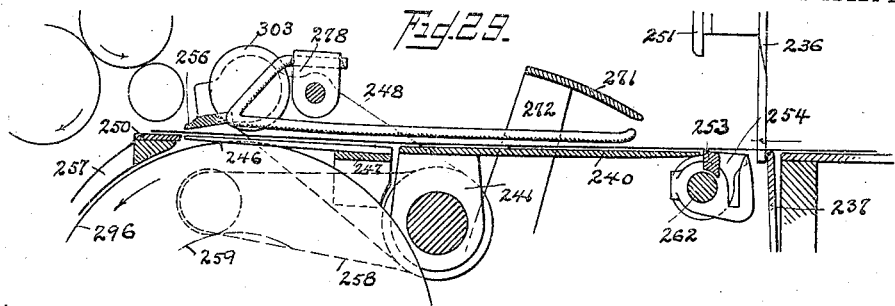
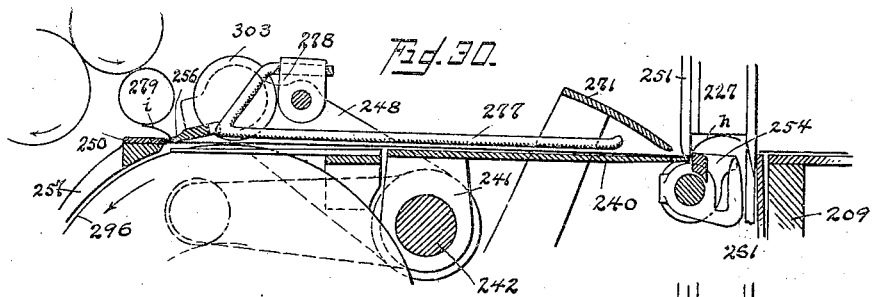
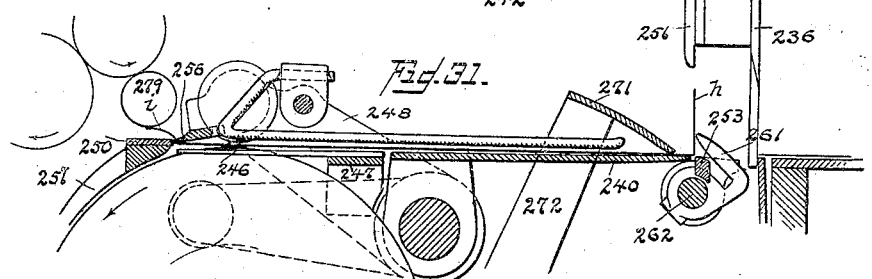
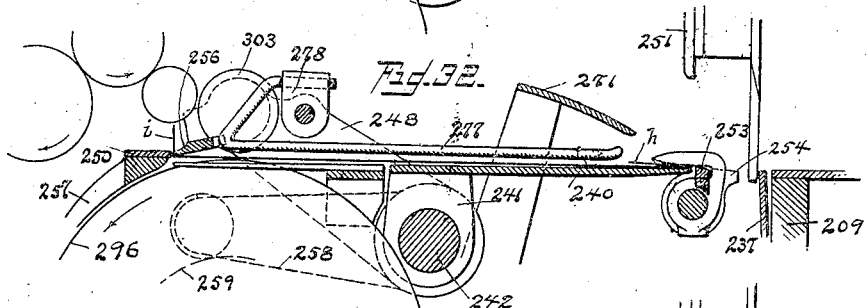
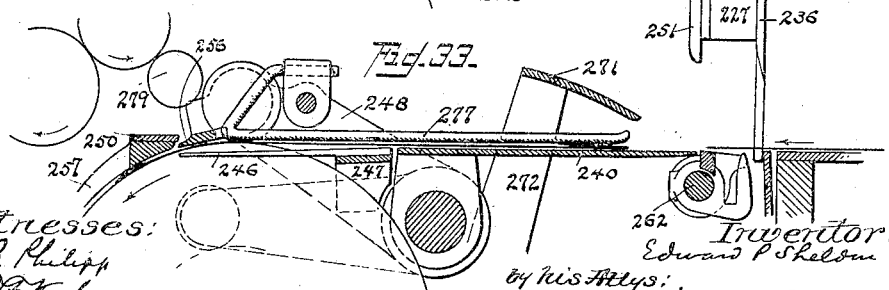

UNITED STATES PATENT OFFICE.

EDWARD P. SHELDON, OF NEW YORK, N. Y., ASSIGNOR, BY MESNE ASSIGNMENTS, TO R. HOE AND CO., OF NEW YORK, N. Y., A CORPORATION OF NEW YORK.

ENVELOP-MAKING MACHINE.

1,126,305.              Specification of Letters Patent.      Patented Jan. 26, 1915.

Application filed February 28, 1907. Serial No. 359,710.

*To all whom it may concern:*

Be it known that I, EDWARD P. SHELDON, a citizen of the United States, residing at New York, county of Kings, and State of New York, have invented certain new and useful Improvements in Envelop-Making Machines, fully described and represented in the following specification and the accompanying drawings, forming a part of the same.

This invention relates to certain improvements in envelop machines.

The invention has in view the improvement of that class of envelop machines relating to the formation of envelops from a running web, and one of its objects is to improve the various mechanisms of that class of machines so as to form the envelops more quickly and cheaply than heretofore.

More specifically considered, another object of the invention may be said to be the formation from a running web of an envelop which is provided with a detachable tongue or coupon which may be used for various purposes, such, for instance, as to enable a count to be made of the articles inclosed in the envelops.

The invention, furthermore, embraces certain improvements in the construction of the several parts of the machine, all as will be hereinafter pointed out and more particularly specified in the claims.

Referring to the drawings Figure 1 is a side elevation of a machine embodying the invention. Fig. 2 is a sectional side elevation on an enlarged scale of the printing mechanism employed and certain of the parts connected therewith. Figs. 3, 4 and 5 are side, plan and end views respectively of the specific mechanism employed for operating the printing couple. Figs. 6 and 7 are detail views of a ratchet mechanism forming a part of the printing couple operating mechanism. Fig. 8 is a side elevation, partly in section, of the tongue forming cutter and its operating levers. Fig. 9 is a detail view of a shield employed in connection with the tongue cutter die, and the operating mechanism therefor. Fig. 10 is a front elevation of the tongue cutter. Fig. 11 is a front elevation of a fold defining blade employed in connection with the tongue cutter. Fig. 12 is a section on the line 12—12 of Fig. 11. Fig. 13 is a plan view of a portion of the web after it has been acted on by the tongue cutter and fold defining blade. Fig. 14 is a side elevation, partly in section, of the slitting, creasing, pasting and tongue folding mechanisms, this view also showing the web turning and controlling means. Fig. 15 is a detail view of the cylinder which carries the tongue folding mechanism, said cylinder also coöperating with the slitting and creasing mechanism. Fig. 16 is an end view of the mechanism shown in Fig. 15, certain parts being shown in section. Figs. 17 to 21 are diagrams illustrating the operation of the tongue folding mechanism. Fig. 22 is a plan view of the web controlling and turning means. Fig. 23 is a section on the line 23 of Fig. 22. Fig. 24 is a longitudinal section of a partly folded envelop. Fig. 25 is a cross-section of the same. Fig. 26 is a detail sectional view of one of the edge turners illustrating its operation. Fig. 27 is a plan view of the end folding and delivery mechanisms and parts connected therewith. Fig. 28 is a sectional elevation of the construction shown in Fig. 27. Figs. 29 to 33 are diagrams illustrating the operation of the end fold forming, creasing and pasting devices and the delivery mechanism.

Referring to the drawings which illustrate one embodiment of the invention, the various mechanisms to be hereinafter described are mounted in side frames indicated at 1. The paper, in machines embodying the invention in its best form, will be supplied in the form of a web indicated at W, and the side frames of the machines are provided with brackets 2 in which the web roll 3 is supported. These brackets are provided with the usual means for adjusting the web roll endwise, these means being operated by a hand wheel indicated at 4. In order to prevent the web roll from over-running under the pull of the web, the shaft of the roll may be provided with a pulley 5 with which coöperates a brake shoe 6, this shoe being carried on a pivoted bent lever 7 and is adjusted by means of a screw and hand-wheel 8.

Machines embodying the invention may be provided with continuously operating web feeding means which may be of any suitable construction. As shown, the web is fed between a pair of rolls 9, 10, the roll 10 being provided with a gear 11, indicated in dotted lines in Fig. 1, which meshes with a gear 12 mounted on the main driving shaft 13, the shaft being supported in bearings rising from the frame. In the particular construction shown, the roll 9 is mounted in spring bearings of the usual construction, these bearings being indicated at 14. Inasmuch as certain of the mechanisms hereinafter referred to are intermittently operated, the web is given an intermittent movement through the machine and the continuously operating feeding mechanism will, therefore, produce slack in the web as is illustrated in Fig. 1.

Machines embodying the invention will usually be provided with printing means, and in the best constructions, the printing couple will be composed of cylinders. The particular construction of the cylinders and their operating mechanism is illustrated in Figs. 1 to 7. Referring to these figures, the impression cylinder, indicated at 15, is mounted on a shaft 16 supported in the usual boxes mounted in the frame. The printing cylinder, indicated at 17, is mounted on a shaft 18 similarly supported. These cylinders may be intergeared, as illustrated, the shaft 16 being provided with a gear 19 and the shaft 18 with a gear 20.

In the best constructions embodying the invention, the cylinders will be given a continuous rotary movement. The means by which this continuous rotary movement of the cylinders is effected may be varied within wide limits. In the particular construction illustrated, the shaft 18 (see Fig. 3) is provided with a collar 21 which is fast thereon. Two driving gears 22, 23 are provided, these gears being loose on the shaft and being located on opposite sides of the collar 21. The gear 22 carries a pair of pawls 24, these pawls being located in recesses in the gear. These pawls are impelled toward the collar by springs 25 which bear against a backing plate 26. The collar 21 is provided with a pair of notches, indicated in dotted lines at 27 in Fig. 7, with which these pawls may engage. The gear 23 is provided with a similar pair of pawls 28 impelled by springs 29 resting against a backing plate 30, the collar 21 being provided with notches 31 with which these pawls may engage. The gear 22 is in the particular construction illustrated, engaged by a rack 32 and the gear 23 is engaged by a rack 33, these racks being pivoted on a common pin 34 mounted on a crank disk 35. This crank disk is provided with ways in which is mounted a slide 36, the pin 34 passing through a hole in this slide and through a slot in the disk 35. The slide 36 is provided with a slot 37 which surrounds a bolt 38 by which the crank disk is held to its shaft 39. This construction permits slight adjustments of the pin 34 in the crank disk, thereby varying the amount of its eccentricity. The rack 33 has the opening in its hub slightly enlarged and is connected by screws 40 to an arm 41 which extends from a hub 42 mounted on the pin 34 before referred to. This rack is also provided with a threaded collar 43 in which works a set screw 44 tapped into the end of the arm 41. This arm 41 is slotted, as indicated in Fig. 4, the screws 40 passing through these slots. This construction enables the rack 33 to be given a lengthwise adjustment.

As the crank disk 35 rotates, it will be understood that the racks are reciprocated and that the pawls 24, 28 will alternately engage the collar on the shaft 18 so as to give this shaft a continuous rotation. The adjustments referred to make it possible to cause the pawls 28 to be accurately adjusted with respect to the notches with which they are to engage.

The shaft 18, in the particular construction shown, is journaled in the side frames and has its outer end supported by a bracket 45 secured to the frame (see Fig. 5). The rack 32 is supported and guided in a box guide 46 hanging from the shaft 18 and the rack 33 is supported and guided in a similar box guide 47 mounted on the shaft 18. The shaft may also, if desired, be provided with a friction collar 48, this collar having an extension 49 which bears against the web 50 of the bracket, this construction preventing the shaft from overthrowing under the operation of the racks and gears referred to. The shaft 39, which carries the crank disk 35, may be driven by means of an intermediate 51 from the gear 12 before referred to, this intermediate meshing with a gear 52 fast on the shaft.

The machine illustrated is constructed to operate, if desired, on a double wide web. The printing cylinder is, therefore, in this construction, provided with means for carrying two sets of printing plates arranged side by side so as to deliver an impression on each half of the web. The particular construction by which the printing plates are held upon the cylinder is not, however, essential to an understanding of the present invention and will not, therefore, be specifically described. It may be remarked, however, that the plates illustrated at 53 (Fig. 2) cover only one-half of the cylinder and are held in position by clips or plate holding devices 54 which may be of any usual or desired construction.

The ink may be supplied to the printing cylinder in any desired manner. In the particular construction illustrated, there is provided a large distributing cylinder 55 with which coöperate three distributing rolls 56 (see Fig. 1) of a suitable type, the ink from this cylinder 55 being transferred to the printing cylinder by form rollers 57, 58, the roller 57 being spring mounted. The means for mounting and operating these rollers is well-understood in the art and need not, therefore, be specifically described, further than to say that the distributing cylinder 55 is driven through an intermediate 59 (see Fig. 2) which is in mesh with a gear on the cylinder and a gear on the shaft 18. The ink may be delivered to the cylinder 55 from a fountain 60 by means of a pawl operated fountain roll 61, (see dotted lines in Fig. 1) and a ductor roll 62. The fountain and ductor rolls may be operated, by connections not necessary to describe in detail, as they are well-understood in the art, from a shaft 63 provided with a worm wheel 64 driven from a worm on the shaft of the continuously running feed roll 10.

If desired, a supplementary printing device may be employed, such, for instance, as a device for applying numbers to successive portions of the web, so that the resulting envelops will be numbered. While the mechanism of this supplementary printing device may be varied widely in construction, as shown, there is provided a shaft 65 which is supported in sliding spring controlled boxes 66 (see Fig. 2) suitably supported in the frame of the machine. This shaft is provided with a gear 67 which meshes with the gear 19 before referred to as on the shaft 16. The impression cylinder 15 is provided at each end with rings or bearers 68, these bearers being cut away opposite the point where the supplementary printer is to come into operation, as clearly shown in Fig. 2. The shaft 65 is provided with a pair of disks 69 which coöperate with these bearers. It is apparent that, as the cylinder 15 and the shaft 65 revolve, the shaft, owing to its sliding boxes, will be held away from the surface of the cylinder except when it is permitted to move in by the cut away portion of the bearers. In the construction shown, the shaft 65 carries the supplementary printing device, such, for instance, as a numbering mechanism, indicated in dotted lines at 70. Inasmuch as the particular construction of this supplementary printing device is not necessary to an understanding of the present invention, it will not be described in detail. The mechanism for supplying ink to this supplementary printing mechanism may be of any suitable construction. In the best constructions, however, as in the machine shown, this supplementary printer will derive its ink from the same source as the forms on the printing member of the couple. While this may be accomplished in various ways, as illustrated, that half of the printing cylinder which is not occupied by the forms will be provided with an ink carrying surface 71 which receives ink from the rollers 57, 58 before referred to as this portion of the cylinder passes them. This surface 71, therefore, forms a distributing surface by which ink is transferred to a roller 72, this roller being mounted on a shaft 73 suitably supported in bearings 74. These bearings 74 may have extending from them rods 75 which are surrounded by springs 76, these rods passing through brackets 77 secured to the frame. The bearings 74 may be carried on bars 78 which are secured to half collars 79 surrounding a shaft 80, see dotted lines in Fig. 2. This shaft 80 may carry a coöperating distributing roll 81, the shaft being provided with a gear 82 which meshes with a gear 83 on the shaft 16, and being supported in suitable bearings in the frame. This roll 81 is in contact with a distributing roll 84 which delivers the ink directly to the supplementary printer. The roll 72 may be provided with bearers 85 which coöperate with bearers 86 on the printing cylinder 17, so that the roll 72 is held away from the form surface or the cylinder.

Suitable cutting or incising mechanisms are employed to properly shape the web which is subsequently to be formed into blanks. When, as is the case in the machine illustrated, a double wide web is to be operated upon, the cutting mechanisms will be so constructed as to properly shape the web so that after it is divided longitudinally, it will present duplicate blanks arranged side by side. When, further, as is the case in the machine illustrated, the envelops to be formed are to have tongues or coupons attached thereto, the cutting mechanisms will be properly constructed to form such tongues or coupons, which tongues or coupons, however, are to be distinguished from the tabs or flaps at the sides or ends of the envelop which are pasted and by which the envelop is secured together.

While the cutting mechanisms employed may be varied widely in construction, in the particular machine illustrated, there is provided a bed plate 87 which extends across the machine from side to side and is suitably supported in the side frames (see Fig. 10). This plate serves to support three die plates 88, 89, 90. The shape of these die plates and of the coöperating cutters will be understood from an inspection of Fig. 13 which illustrates a section of the web after the cutters have operated.

In the particular machine illustrated, there is provided a frame or casting 91 which extends across the machine and is bolted to the bed plate 87. This frame is provided with two rearward extensions 92 which serve to support an operating shaft 93 (see Fig. 8). Working in guides secured to the frame are three upright stems or plungers 94, 95, 96. These three plungers are connected (see Fig. 10) by a cross bar 97, this bar being provided with rounded studs 98 at its ends. These studs 98 are engaged by arms 99 (see Fig. 8) fast on the shaft 93. Extending from this shaft 93 is an operating arm 100, this arm having connected to it a fork 101, this fork straddling the shaft 39 which is the shaft before referred to as carrying the crank disk 35. The fork has secured to it a roller 102 which coöperates with an operating cam 103 fast on the shaft 39. The shaft 93 is further provided with an arm 104 to which is connected a spring rod 105 (see Figs. 8 and 10) the purpose of which is to hold the shaft in such a position that the roller 102 will run in contact with the cam 103. The plunger 94 carries a head block 106 and to this head block is secured a steel cutting block 107 corresponding in outline to the incision in the right hand side of the web as it appears in Fig. 13. Between this cutting block and the head is located a wedge shaped block 108, the purpose of this block being to cause one side of the cutter block to be lower than the other, so that a shear cut is produced. The plunger 95 carries a head 109 to which is secured a cutter block 110 of the outline of the middle incision of the web as it appears in Fig. 13, a wedge shaped block 111 being introduced between the head block and cutter block to produce a shear cut. The plunger 96 carries a head block 112 to which is secured a cutter block 113, this block corresponding in outline to the left hand incision of the web, as it appears in Fig. 13, a wedge shaped block 114 being interposed between the block and head.

The cutting mechanism just described is designed not only to shape the blanks but also to produce extensions $t$ (see Fig. 13) which are to form tongues or coupons on the completed envelops, these tongues or coupons being independent of the securing flaps with which the blanks are formed. Further, in the particular machine shown, these tongues or coupons are to be folded against the web, so that they will be inside the envelops when the same are completed. If desired, the line on which these tongues or coupons are to be folded may be defined, and this may be effected during the cutting operation. While this may be accomplished in various ways, the heads 106, 109 have secured to them perforating blades 115, these blades being held in position by screws 116. These screws have collars 117 on them, between which and the heads the perforating blades are held.

Each perforating blade may be provided with a stripper plate and may also have paper holding presser feet coöperating therewith. In the construction illustrated, the presser feet, marked 118, are carried on springs 119 which are located in sockets in bars 120. The stripper plates 121 are located between the bars 120 and the perforating blades 115. These plates 121 have perforations which surround the collars 117 before referred to. The space between the bars 120 and the perforating blades 115 is so calculated as to allow the stripper blades 121 to work snugly between them. In the operation of the mechanism, the stripper blades strike the paper first, after which the presser feet come into operation. The cutter blocks then form the incisions in the web, after which the perforating blades form a line of perforations across the base of the extensions $t$. On the return movement, the knives and perforators move away from the web, after which the presser feet and stripper blades retreat. It will be understood, of course, that the web is stationary during the operation of the cutting mechanism, and that its feed is resumed after the cutting mechanism has operated.

If desired, there may be employed suitable means for preventing the cut edges of the web from coming in contact with the edge of the die blocks, as the web begins its travel after cutting. While this means may be varied in construction, as shown, two lifters or die shields are employed, one for the middle cutter and one for the cutter on the right hand side of the web, as the same is seen in Fig. 13. In the particular construction illustrated, these lifters each consist of a blade 122 (see Figs. 8 and 9), these blades being mounted on blocks 123 which straddle and are pivoted to the upper ends of levers 124, the pivots of the blocks being marked 125. Springs 126 may be employed to keep the blades down against the die blocks. The levers 124, as shown, are pivoted on studs 127 secured to brackets 128 depending from the plate 87. These levers have connected to them forks 129 provided with rollers 130, the outline of these forks being shown in dotted lines in Fig. 8. The forks straddle the shaft 39 before referred to and the rolls 130 run on cams 131 fast on the shaft. In order to hold the rolls 130 against the cams 131 a spring rod construction, 132, of a usual type, is employed, the spring rods being supported in hangers 133 secured to the bed 87. The pivotal points of the levers 124 are so arranged with relation to the edges of the die blocks 88, 89 that, as the lifters move forward, the edges of the blocks serve as fulcra and raise the blades 122 slightly, so as to lift the web slightly and thus insure that the edges of the incisions will not catch the cutting edges of the die blocks as the web moves forward. Fig. 9 illustrates the position of these lifters prior to the time they move and Fig. 8 illustrates them in their forward and operating position.

It has been explained that the web is stationary during the cutting operation, and also that the printing couple is constantly rotating, and attention has also been called to the fact that the continuously operating web feeding rolls by which the web is fed into the machine act, during the stoppage of the web, to produce slack therein. Under these conditions, it is desirable to employ suitable means for preventing the web from being pulled forward by the continuously rotating impression member of the couple, around which the web passes. When a web holding means such as has been referred to is employed, the construction thereof may be varied within wide limits.

In the particular construction illustrated, there is employed (see Figs. 1, 2 and 10) a set of tension bars 134, 135, 136 such as is common in web feeding constructions, and one of these bars is utilized as one member of the web holding means. As illustrated (see Fig. 2) the bar 134 has coöperating with it a friction pad 137 mounted on a block 138 which is pinned to a fork 139 straddling the shaft 39 before referred to. This fork also carries a roll 140 which runs on a cam 141 mounted on the said shaft. In order to throw the pad quickly away from the bar 134 when the tension is released, the block 138 has secured to it a pair of lugs 142 in which are mounted spring pins 143 entering sockets in the bar 136 (see Fig. 2). The cam 141 is so shaped that it will, just before the cutters hereinbefore described come into operation, throw the fork forward and cause the pad 137 to press the web firmly against the bar 134. When the cutting is completed and the web is about to start forward, the roll 140 runs off the high part of the cam and the fork is thrown quickly back by the spring pins 143, thus releasing the web and permitting its forward movement to be resumed.

It has already been stated that the particular machine herein illustrated operates to form tongues or coupons in the web, which tongues or coupons are to lie inside the completed envelop. While the bending in of the tongues may be accomplished in various ways and at any proper period in the envelop forming operations, in the particular machine illustrated, the tongue bending means operates during the travel of the web and directly after the cutting operations have been completed. As shown, the tongue bending devices (see Figs. 14 to 21 inclusive) include a roll 144, this roll being mounted on a shaft 145 which extends across the machine and is suitably mounted in the side frames. This shaft has, in the machine shown, an intermittent movement effected through a gear 146 on the shaft, this gear being in mesh with an intermediate 147 mounted on a stud on one of the side frames. This intermediate 147 is in mesh with another intermediate 148 which derives its movement from a gear 149 mounted on a short shaft 150 suitably supported in the machine. This shaft 150 has fast thereon a collar 150' (see dotted lines in Fig. 14) similar to the collar 21 before described and illustrated in Figs. 4 to 6 inclusive, except that this collar has pawl notches on one side only. Loosely mounted on the shaft 150 is a mutilated gear 151 which carries a pair of spring pawls 152, these pawls being similar to the spring pawls illustrated in Figs. 4 to 6 before referred to. The shaft 150 also supports a box guide 153 similar to the box guide 46 before described and illustrated in Figs. 3 and 5, this box guide supporting a rack 154 which is in mesh with the mutilated gear 151. This rack 154 is formed on a bar 155 (see Figs. 1 and 28) secured to a crank pin 156 on a crank disk 157. This crank disk 157 is mounted on a shaft 158 which carries a driving gear 159. This driving gear is in mesh with a gear 160 which is in turn in mesh with an intermediate 161, this intermediate 161 being in mesh with the gear 52 before described as mounted on the shaft 39.

The operation of the rack driving mechanism for the shaft 150 is similar to the mechanism for driving the shaft 18 before described except that the shaft 150 is not continuously rotated. In view of this fact, a fuller illustration of the details of the mechanism than is given is believed to be unnecessary.

Means may be provided to prevent the roll 144 from over-running at the end of the intermittent movement imparted to it. This means may consist, as shown in Figs. 1 and 14, of a friction shoe 162 mounted on a lever 163, this lever being pivoted at 164 to a bracket 165 secured to the machine frame. The other end of this lever (see Figs. 1 and 28) extends back and carries a roll 166 which is operated from a cam 166' on the shaft 158.

The roll 144 before referred to, in the particular machine illustrated, carries a shaft 167 which may be suitably journaled in the ends of the roll. Mounted on this shaft is a pair of tongue bending plates 168 which may be of the configuration illustrated in the various figures. As these tongue bending plates are duplicates, only one of them is shown. The shaft 167 is provided with a crank arm 168' which carries a roller 169. As the web passes over the roll 144, and at the proper time in its movement, the roll 169 is operated by a cam 170 which rocks the shaft and throws the bending plate up and over. During this movement, the plates strike the tongues t and bend them down. The various positions of the bending plates, the shaft and roll are well-shown in the diagrams Figs. 17 to 21, the first figure showing the position of a tongue before the shaft has been operated by the cam, and the last figure showing the tongue bent down against the web. This operation, it will be understood, is effected during the travel of the web. The cam 170 is formed in one piece with a supporting plate 171 secured to a roller guide 172 by suitable screws, this guide being formed on a bracket secured to a cross bar 173 which forms a part of the frame. The cam 170 has a curved recess which enables it to be fitted on and partially supported by the shaft 145 before referred to.

Means may be employed, if desired, for holding the web against the strain set up by the tongue bending operation. While these means may be of any suitable description, this result may be conveniently effected by means of two pairs of rollers 174 which bear against the web and the roll 144 at the point where the tongue bending operation takes place. These rollers may be mounted on arms 175 which extend from a bar 176 extending across the machine and supported in the frame.

The particular machine illustrated employs creasing and pasting mechanisms and also a slitting mechanism by which the web is divided longitudinally into similar halves. While these mechanisms may be located at any suitable point and be of any suitable construction, they may well be located, as in the particular machine shown, so that they may operate in connection with the roll 144 before referred to.

The machine shown employs four creasers, only three of which, however, are illustrated. These creasers consist of circular blades 177 coöperating with grooves 178 formed in the roll 144. These circular creasing blades are mounted on a shaft 179 supported in brackets 180 which are dropped from the bar 176 before referred to.

The pasting mechanism employed may comprise the usual pasting disks, one for each half of the web, only one of these disks, 181, however being shown. Each of these disks may be provided with a cut-out portion, as 182, so that paste may not be applied to the roll 144 through the incisions in the web. Coöperating with each disk is a fountain, only one fountain, 183, being shown. These fountains are secured to a cross-bar 184 which rests on brackets 185 formed on the main frame. In order to adjust the fountains and to back them away from the web, if necessary, there may be provided a shaft 186 provided with arms 187 which engage the bar 184 before referred to. The shaft 186 has secured to it an operating arm 188 which is positioned by means of two set screws 189, 190. The usual doctor blade 191 may be employed, this blade being controlled, as is common, by a set screw 192.

The slitting mechanism may comprise a slitter disk 193 of usual construction, this disk being mounted on a hub 194 and coöperating with a groove 193' in the roll 144. The slitter disk and its hub may be mounted on a shaft 195 supported in hangers 196 depending from the bar 176, the shaft being driven, as is usual, by a suitable train of gearing not necessary to illustrate. The broken line s (Fig. 13) indicates the line on which the slitter is to operate and it will be seen that when the web is thus divided it is converted into two webs consisting of a series of envelop blanks, the body portions of successive blanks being connected and each body portion having a flap of nearly the size of the body portion.

In the particular machine illustrated, after slitting, each half of the web is given a longitudinal fold and by subsequent operations is converted substantially into tube form. The mechanisms by which each half of the web is converted into tube form are the same, and the illustration is, therefore, confined to mechanism for operating upon one half of the web.

The longitudinal folding mechanism may be varied in its construction. In the particular machine shown, it includes (see Figs. 14, 22 and 23) a turner which may consist of a bent wire 197 mounted in a bracket 198, this bracket being secured by a screw 199 to a bar 200 extending across the machine. The forward end of this turner extends down so as to enter one of the incisions formed by the cutting knives hereinbefore described and folds what may be termed the flap portion, marked f, of the web over upon the main body of the web, this main body of the web being held in position by a former plate 201 carried on a bracket 202 secured to a bar 203 extending across the machine, the flap portion of the web turning over the edge of this plate which lies along one of the creases already formed therein.

Means may be provided to control the flap f of the web as it turns and in the best construction, where such means is employed, it will be located, as in the particular machine shown, so as to prevent the opening out of the inturned tongue t, if the machine is to produce envelops having such tongues. This controlling means, in the particular machine illustrated, consists of a bent wire 204 secured to a bracket 205 carried on the bar 203 before referred to. The particular machine illustrated is also provided with a holding plate 206 which bears on the flap portion f of the web, this plate being secured to the under side of the bar 203. The function of this plate is to prevent the inturned tongue from springing up and unfolding.

Simultaneously with the turning over of the flap portion f of the web just described, the opposite edge of the web is, in the particular machine shown, given a narrow fold to provide a narrow pasting flap f'. This is effected by means of a turner plate 207 (see Fig. 22) which is secured to and lies along the edge of a plate 208 which underlies the former 201. This plate 208 is supported on the bar 173 before referred to and on another bar 209 which will be hereinafter described.

It may be here remarked that the creaser which defines the fold line of this pasting flap f' will, as a rule, operate to turn the flap up somewhat and the forward end of the edge folder 207 is beveled so as to permit the turned up edge to pass it. This edge folder 207 has mounted upon it a second edge folder 210 which bends down the flap f', after which the folded edge of the web passes under a lip 211 formed on the folder 207, the operation being clearly illustrated in Fig. 26. This lip holds the flap f' firmly in position so that the flap f may fall upon it, as it is turned, the lip being made so narrow, however, that the edge of the flap f does not touch it. This flap f, it will be understood, carries a line of paste which has been applied to it by the pasting disk 181 before described.

A presser may be provided to assist in laying the fold produced by the turner 197. In the machine illustrated, such a presser is employed, this presser, marked 212, being carried by a bar 213 mounted on the plate 208.

It has been previously stated that the web is advanced through the machine continuously except during the time the cutting mechanism hereinbefore described is operating. The means employed for thus advancing the web may be widely varied in construction. In the particular machine shown, drawing rollers are employed for this purpose, there being two pairs of such rollers for each half of the web, the drawing rollers for one part of the web only being illustrated. As illustrated, the upper drawing rollers, marked 214, are mounted on a shaft 215. These rollers coöperate with lower drawing rollers 216 mounted on a shaft 217. The shaft 215 (see Fig. 28) is provided with a gear 218 which is in mesh with a gear 219 mounted on the shaft 217. This gear 219 is in turn in mesh with an intermediate 220 which is in mesh with a second intermediate 221 (see Fig. 14) driven by the gear 149 on the shaft 150 before referred to. As has been indicated, the drawing rollers 214, 216 act upon one half the web, the drawing rollers for the other half of the web which are not shown being also mounted on the shafts 215, 217. It may be remarked that the plate 208 before referred to is cut away so as to permit the rolls 216 to work through it.

The rolls 214 and 216 are arranged so as to bite on the folded web at the edges and thus not only forward the web but also operate to thoroughly crease the folds and insure the proper positioning of the flaps. To increase the bite of the rolls, the bracket 198 before referred to may be provided with a rearward extension 222, a screw 223 being tapped through a hole in this extension and caused to bear on the shaft 215 between the rolls through the medium of a shoe 224 (see dotted lines in Fig. 28).

A pair of holding fingers 225 may, if desired, be employed to press on the folded web between the rolls to assist in controlling the folded web both before and after it leaves the rolls. These fingers 225 may be secured in blocks 226 mounted on the bar 200 before described.

The web has been, by the operations so far described, converted into a series of connected blanks, these blanks being so-shaped as to provide a plurality of envelops having a side seam, an infolded tongue and two end flaps, marked h and i respectively, (see Fig. 24). By the further operation of the particular machine shown, these blanks are severed from each other, and the flaps referred to turned over onto the body of the envelop, the flap i being also pasted.

The mechanism by which the blanks are severed may be varied in construction. As shown (see Fig. 28), there is provided a cross-head 227 which moves in ways in the machine frame. This cross-head has connected to it operating rods 228, one on each side of the machine, these operating rods passing through the cross-head and the cross-head being secured to them by means of bolts 229. These rods pass through guiding brackets 230 secured on the bar 209 before referred to and have connected to them the upper ends of rods 231 (see Figs. 1, 10 and 28), these rods 231 having their lower ends adjustably connected to stirrups which form the upper ends of forked rods 232. These forked rods straddle the shaft 39 before referred to and are provided with rolls 233 which run on cams 234 on the shaft 39. Springs 235 hold the rods and forks down so that the rolls are maintained in contact with the cams.

The cross-head 227 carries two severing knives 236, these knives coacting with blades 237 secured to the bar 209 before referred to only one knife and blade being shown. These blades 237 are secured to the bar 209 by means of screws located near their lower edges and have a slight amount of play, the blades being kept over toward the path of the knives by springs 238 socketed in the bar 209. The cross-head carries a series of depending fingers 239 which coact with these blades and prevent their moving under the stress of the springs so far toward the path of the knives 236 as to get directly under them. Before the knives 236, 237 act, an envelop blank has been fed forward by the rolls 214, 216, and the blank is supported by a plate 240. This plate 240 has depending from it near one end ears 241, these ears surrounding and resting upon a shaft 242. At the other end the plate is provided with a pin 243 which passes through a bracket 244, the pin being surrounded by a spring 245, so that the plate is spring supported. The machine contains two of these plates, but as they are duplicates, only one is shown. The plate 240 just described serves to support that end of the blank which is nearer the knives 236, 237. The other end of the blank is supported by a series of spring fingers 246 (see Figs. 27 and 28), these fingers being carried on a cross bar 247 in turn supported by arms 248 extending from hubs 249, these hubs being fast on the shaft 242 before referred to. The extreme end of the blank, in the particular machine shown, is supported (see Fig. 28) by a narrow shelf 250 mounted on brackets 250' extending inward from the frame. It will be understood that there are two of theses shelves 250, one on each side of the machine, only one, however, being shown. Depending from these shelves are narrow fingers 257 which will be hereafter referred to.

In the particular machine shown, the blanks are not only severed from the two-half webs but substantially simultaneously with the severing operation creases are formed in the blanks which determine the fold lines of the flaps $h$, $i$ before described. It will be understood that the operation of the incising cutters before described forms the connected blanks in such a way that the flap $h$ of one envelop is in one piece with the flap $i$ of the succeeding envelop. When, therefore, as the cutters 236, 237 act, they not only sever the blanks but determine the length of these flaps.

While the creasing mechanism employed may be varied widely, in the particular construction illustrated, the cross head 227 carries two creasing blades, only one, marked 251, being shown. Secured to the bar 209 are two curved brackets 252. These brackets serve to support shelves, only one, marked 253, being shown. These shelves extend backward from the brackets toward the knives 236, 237. These shelves are notched out to form narrow portions 254, (see Figs. 29 to 33) to permit the operation of certain folders to be hereinafter described. The forward edge of each shelf 253 operates in connection with a creaser blade 251 to determine the fold line between the flap $h$ (see Fig. 24) and the body of the envelop. The fold line between the flap $i$ and the body of each envelop is determined by a striker or creaser blade 256 (see Fig. 28 and the diagrams referred to) this blade being mounted on the pair of arms 248 fast on the rock-shaft 242 before referred to. This rock-shaft has an operating arm 258 (see dotted lines in Fig. 28) carrying a roll which runs on the surface of a cam 259, shown in dotted lines in the figure referred to. A spring rod construction, 260, of the ordinary form is employed to hold the arm down on the cam.

Means are provided for turning over that flap of the envelop which lies adjacent the knives 236, 237. While the particular construction of these means may be varied, in the machine shown, angular flap turners 261 are employed for this purpose, these flap turners being mounted on a shaft 262 supported in curved brackets 252 before referred to. This shaft is provided with a pinion 263 which is in mesh with a rack formed on a bar 264, this bar extending through an opening in the bar 209 before referred to. This rack bar is secured to a fork 265, (see dotted lines in Fig. 28) which straddles a shaft 266 and is provided with a roll 267 which works on the circumference of a cam 268 mounted on the shaft 266. The shaft 266 is provided with a gear 269 which meshes with the gear 159 before described as the driving gear for the shaft 158. The angular flap turners work through the notches in the bar or shelf 253 before referred to and come into operation after the cross head 227 begins its upward movement, that is, subsequent to the cutting and creasing operations.

Means may be provided for holding the paper in advance of the flap turner fingers so that it will not buckle as the flap is turned over. While these means may be varied, in the particular construction shown blades 271 are provided for this purpose, these blades being mounted on arms 272, only one blade and arm being shown. These arms are fast on a rock-shaft 273 and one of the arms (see Fig. 28) is provided with a cam roll 274 which runs on the circumference of a cam 275 mounted on the shaft 158. Connected to this same arm 272 is a spring 276 which holds the arm against the cam.

In order to prevent the flap turned in by the angular flap turners from springing out again after folding, holders, which may consist of sets of wires 277, are provided, these wires being carried in heads 278 mounted on the arms 248 before described.

Means may be provided for applying paste to the third flap $i$ of the envelop formed by the creasers 250, 256. While the paste may be applied in various ways, in the construction shown, there is provided a ductor roll 279 mounted on a shaft 280 (see Figs. 27 and 28). This ductor roll shaft is mounted in arms 281 fast on a rock-shaft 282 suitably supported in the frame. This rock shaft has also fast upon it an arm 283 which has pivoted to it a fork 284, this fork straddling the shaft 266 and being provided with a cam roll 285. This cam roll 285 runs on the surface of a cam 286 which is fast on the shaft 266 before referred to. The ductor roll shaft 280 is provided with a gear 287 meshing with a gear 288 loose on the shaft 282 which also carries a loosely mounted paste carrying roll 289. The gear 288 meshes with a gear 290 on a shaft 291, this shaft supporting a paste roll 292 which runs in a paste fountain 293. The paste roll shaft 291 also carries a large gear 294 which is in mesh with a gear 295 on the shaft 266 before referred to. It will be understood that the pasting mechanism just described operates in connection with one half the web only, and that there is or may be employed a similar mechanism for pasting the other half of the web. As such pasting mechanisms may be duplicates, it has not been deemed necessary to show more than one mechanism.

The ductor roll 279 is in the path of the flap which will be turned up by the creasers 250, 256, so that the flap is caused to strike the ductor roll by the action of the creasers. The short flap turned up by the creasers 250, 256 and pasted as described should now be turned down and the envelop delivered. While this may be accomplished in various ways, in the particular machine shown, there is provided a delivery roll 296 which is fast on the shaft 266, this roll underlying the spring fingers 246 before referred to. This roll 296 may be provided with grooves 297 which will permit the fingers when rocked to pass below the circumference of the roll. Coöperating with this roll are two presser rolls 298, 299, these rolls being mounted in spring bearings and being provided with gears 300, 301 which are in mesh with and driven by a gear 302 on the shaft 266 before referred to. The rock-arms 248 before described are also provided with rolls 303, these rolls overlying the delivery roll 296. It will be understood that the delivery mechanism just described operates in connection with one half the web only, and may be duplicated for the other half.

The operation of the creasers, folders and delivery mechanism will be well understood from the diagrams, Figs. 29 to 33 inclusive. After the rolls 214, 216 have advanced a length of the web they halt while the reciprocating cutting or incising mechanism operates. During this period and while the web is stationary, the cross-head 227 descends and the knives 236, 237 cut off a blank, this blank being, as has been before described, partly folded and pasted. The cross-head continues its descent, causing the creaser 251 to coöperate with the edge of the shelf 253, this edge forming a coöperating creaser. The plate 240 is forced down against its spring 245 to permit the creasers to operate. Simultaneously with the operation of the creaser 251, the arms 248 are rocked so as to cause the striker 256 to coöperate with the edge of the shelf 250 and form the crease which determines the fold line of the flap $i$ at the other end of the envelop. The action of this striker causes this flap $i$ to turn up so as to strike the pasting roll 279. Immediately thereafter, the blade 271 is thrown over so as to hold the blank and the angular turners 261 are rocked up to turn over the flap $h$, these turners working through the openings in the shelf 253. By this time, of course, the cross-head has retreated so as to be out of the way of the turners. As the turners complete their movement, the blades 271 move back out of the way so as to permit the flap $h$ to be turned down against the body of the flap. As the folders 261 complete the turning down of the flap $h$, the arms 248 are given a further downward movement. Just as this occurs, the ductor roll 279 is moved upward out of the way of the flap $i$. The continued downward movement of the arms 248, therefore, drops the rolls 303, so that they come in contact with the roll 296 and the blank begins to move forward. This forward movement causes the flap $i$ to be bent down against the edge of the shelf 250, the bending being completed by the depending fingers 257. It will be understood, of course, that the downward movement of the arms 248 referred to moves the fingers 246 down so as to permit the rolls 303 and 296 to grip the envelop. As the envelop moves forward the flap $h$ runs under the holder wires 277 and is thereby prevented from springing up. The envelop is fed forward by the action of the rolls 296 and 303, until its forward end is caught between the rolls 298 and 296, after which the arms 248 rock upward. The rolls 298, 299 and 296 press the envelop, thus causing the pasted flap $i$ to be firmly pressed against the envelop and also still further laying the fold between the body of the envelop and the flap $h$.

The completed envelops may be delivered from the machine in any suitable manner. The machine is or may be provided with two ordinary packing receptacles, it being understood that two envelops will be simultaneously delivered. These packing receptacles (see Fig. 1, wherein, however, only one receptacle is shown) may each consist of a box 305 supported in an opening in the frame and also on brackets 306, one of which is shown. As the envelops are delivered from the rolls 296, 298, 299 they drop into the boxes 305 and are pushed forward by a plunger 307, the stem 308 of this plunger extending rearwardly and being provided with a collar 309. This collar is engaged by a pin on an arm 310, this arm (see Fig. 28) being loosely supported on the shaft 273 before referred to. This arm is provided with a hub 311 from which extends an arm 312 (see dotted lines in Fig. 28), this arm carrying a roll which runs on a cam 313 on the shaft 158 before referred to. This hub 311 also carries an arm 312' to which is connected an ordinary spring rod construction 314 which gives the packer head its backward movement.

While the machine hereinbefore described embodies the best means known to me for carrying out the invention, it is to be understood that changes and variations may be made in the constructions herein described without departing from the invention.

What is claimed is:—

1. The combination with a source of web supply, of a printing mechanism, means for cutting the web to form tongues and for determining the line of fold between the tongues and the web, means for folding the tongues on said line of fold, creasing means for determining the side folds of the envelop, means for determining and forming a flap at each end of the envelop, and means for delivering the envelop with the end flaps folded down.

2. In an envelop machine, the combination with means for forwarding a double wide web, of a plurality of cutters arranged to form a plurality of tongues side by side in the web, means for thereafter slitting the web longitudinally, creasing devices for determining side fold lines in each half of the web, means for folding each half of the web on the fold lines thus formed, and means for simultaneously completing the envelops from each half of the web.

3. In an envelop machine, the combination with means for forwarding a double wide web, of a plurality of cutters arranged to form a plurality of tongues side by side in the web, means for folding the tongues upon the web, means for thereafter slitting the web longitudinally, creasing devices for determining side fold lines in each half of the web, means for folding each half of the web on the fold lines thus formed, and means for simultaneously completing the envelops from each half of the web.

4. The combination with web feeding means arranged to form slack in the web, of a rotary printing couple, means for forming incisions in the web, and means acting directly on the web near the incising points for holding it during the time the incisions are being formed.

5. The combination with web feeding means arranged to form slack in the web, of a rotary printing couple, means for forming incisions in the web, means acting directly on the web near the incising points for holding it during the time the incisions are being formed, and means for converting the incised web into envelops.

6. The combination with means for continuously feeding a web, of a constantly running intermittently operating rotating printing couple, a web incising device, and means acting directly on the web near the incising points for holding it during the incising operation.

7. The combination with means for continuously feeding a web, of a constantly running intermittently operating rotating printing couple, means for cutting the web to form tongues, means acting directly on the web near the incising points for holding it during the cutting operation, means for folding the tongues upon the web, and means for converting the web into envelops.

8. The combination with means for continuously feeding a web, of a constantly running intermittently operating rotating printing couple, a web lifter, a web holder, a cutting mechanism, and means for operating the web holder during the time the cutting mechanism is acting.

9. In an envelop machine, the combination with means for forwarding a web, of a reciprocating tongue forming cutter, a fold defining blade carried by the cutter, a die coöperating with the cutter, a die shield, means for folding the tongues on the line defined by the fold defining blade, and means for thereafter converting the web into envelops.

10. In an envelop machine, the combination with means for forwarding a web, of a reciprocating tongue forming cutter, a die with which the cutter coöperates, a die shield, means for advancing the shield with the web after cutting and for retracting it out of the way of the cutter, and means for converting the web into envelops.

11. The combination with means for forwarding a web, of a tongue forming cutter, a roll over which the web is led, a tongue turner carried by the roll, and means for holding the web against the roll in close proximity to and on each side of the tongue turner.

12. In an envelop machine, the combination with a tongue forming cutter, of a roll over which the web is led, a tongue folder carried by the roll, rollers for holding the web against the roll in close proximity to the tongue folder, and means for converting the web into envelops.

13. The combination with means for forwarding a web, of a tongue forming cutter, a roll over which the web is led, a tongue folder carried by the roll, web holding rolls coöperating with said roll and tongue folder, creasers also coöperating with the roll, web pasting, edge folding and flap forming and cutting devices whereby the web is converted into envelops.

14. In an envelop machine, the combination with means for forming a series of envelop blanks in web form, of a blank severing knife, means for defining fold lines at right angles to the line of travel of the web, a fold turner operating on the rear end of the blank, a coöperating blank holder, and means for delivering the blank and simultaneously therewith folding its front end.

15. In an envelop machine, the combination with means for forming a series of envelop blanks in web form, of means for defining fold lines at right angles to the run of the web, blank severing means, a fold turner operating on one end of the blank, a rockshaft on which the turner is mounted, a blank holder coöperating therewith, and means for folding over the other end of the blank and delivering it.

16. In an envelop machine, the combination with a shelf, of a creasing blade coöperating therewith, means for supporting the envelop blank in position with respect to the shelf, so that the creasing blade may operate thereon, a rock shaft, a fold turner mounted on the rock shaft, a blank holder, and rotary delivery devices for the folded blank.

17. In an envelop machine, the combination with a shelf, of a creasing blade coöperating therewith, blank supporting means, a fold turner, a blank holder coöperating with the turner, a delivery roll, a nipping roll, and means for moving it into and out of operative relation with the delivery roll.

18. In an envelop machine, the combination with a pair of shelves, of creasers coöperating therewith, blank supporting means between the shelves, a fold turner operating on one end of the blank, a coöperating blank holder, a delivery roll, a nipping roll, and means for moving the nipping roll into and out of operation with the delivery roll.

19. In an envelop machine, the combination with a shelf, of blank supporting means, a creaser coöperating with the shelf, a paster in the path of the flap turned up by the creaser, means for moving the paster away from the flap after the flap has been pasted, and delivery means including flap pressing devices.

20. In an envelop machine, the combination with a shelf, of a creaser coöperating therewith, a paster in the path of the flap turned up by the creaser, means for moving the paster out of the path of the flap after the flap has been pasted, a delivery roll, a movable nipping roll coöperating therewith, and flap pressing means.

21. In an envelop machine, the combination with means for forming a series of blanks in web form, of fold defining creasers, a flap turner coöperating with one of the creasers, a paster in the path of the flap turned up by the other creaser, a delivery roll, a movable nipping roll coöperating with the delivery roll, and flap pressing rolls coöperating with the delivery rolls.

In testimony whereof, I have hereunto set my hand, in the presence of two subscribing witnesses.

EDWARD P. SHELDON.

Witnesses:
F. W. H. CRANE,
LOUIS ROEHM.

Copies of this patent may be obtained for five cents each, by addressing the "Commissioner of Patents, Washington, D. C."